(12) United States Patent
Brockman

(10) Patent No.: US 7,954,208 B2
(45) Date of Patent: Jun. 7, 2011

(54) FASTENING MEMBER FOR A MOLDED ARTICLE

(75) Inventor: Clifford Russell Brockman, Strongsville, OH (US)

(73) Assignee: Avery Dennison Corporation, Pasadena, CA (US)

( * ) Notice: Subject to any disclaimer, the term of this patent is extended or adjusted under 35 U.S.C. 154(b) by 799 days.

(21) Appl. No.: 11/980,416

(22) Filed: Oct. 31, 2007

(65) Prior Publication Data

US 2009/0106954 A1 Apr. 30, 2009

(51) Int. Cl.
*A44B 18/00* (2006.01)
(52) U.S. Cl. ............... 24/306; 24/303; 24/442; 428/100
(58) Field of Classification Search .................. 24/442, 24/444, 306, 303; 428/99, 100
See application file for complete search history.

(56) References Cited

U.S. PATENT DOCUMENTS

| | | | |
|---|---|---|---|
| 4,563,380 A * | 1/1986 | Black et al. ............ 428/100 |
| 4,775,310 A | 10/1988 | Fischer | |
| 4,872,243 A | 10/1989 | Fischer | |
| 4,875,259 A | 10/1989 | Appeldorn | |
| 4,931,344 A | 6/1990 | Ogawa et al. | |
| 4,933,035 A | 6/1990 | Billarant et al. | |
| 4,933,224 A | 6/1990 | Hatch | |
| 4,961,894 A | 10/1990 | Yabe et al. | |
| 5,061,540 A | 10/1991 | Cripps et al. | |
| 5,077,870 A | 1/1992 | Melbye et al. | |
| 5,110,649 A | 5/1992 | Morse et al. | |
| 5,260,015 A | 11/1993 | Kennedy et al. | |
| 5,286,431 A | 2/1994 | Banfield et al. | |
| 5,484,505 A | 1/1996 | Isakson et al. | |
| 5,562,790 A | 10/1996 | Ehlert et al. | |
| 5,725,928 A | 3/1998 | Kenney et al. | |
| 5,766,723 A | 6/1998 | Oborny et al. | |
| 5,845,375 A | 12/1998 | Miller et al. | |
| 5,891,547 A | 4/1999 | Lawless | |
| 5,930,876 A | 8/1999 | Takizawa et al. | |
| 5,945,193 A | 8/1999 | Pollard | |
| 6,463,635 B2 | 10/2002 | Murasaki | |
| 6,579,161 B1 | 6/2003 | Chesley et al. | |
| 6,596,371 B1 | 7/2003 | Billarant et al. | |
| 6,613,113 B2 | 9/2003 | Minick et al. | |
| 6,668,429 B2 | 12/2003 | Fujisawa et al. | |
| 6,742,227 B2 | 6/2004 | Ulicny et al. | |
| 6,743,321 B2 | 6/2004 | Guralski et al. | |
| 6,842,950 B2 | 1/2005 | Fleuchaus et al. | |

(Continued)

FOREIGN PATENT DOCUMENTS

DE 19901113 A1 7/2000

(Continued)

OTHER PUBLICATIONS

Search Report and Notification of Transmittal of Search Report and Written Opinion dated Jan. 22, 2009 from corresponding PCT application No. PCT/US2008/011201; 6 pages.

*Primary Examiner* — James R Brittain

(57) ABSTRACT

A fastening member that is capable of attachment to a molded article is disclosed. The fastening member may include at least one fastener element extending from a base and an anchor layer attached to the base. The anchor layer may be coated with a magnetically attractable coating. The magnetically attractable coating may be substantially continuous on select portions of the anchor layer and discontinuous on other select portions of the anchor layer.

18 Claims, 3 Drawing Sheets

U.S. PATENT DOCUMENTS

| | | |
|---|---|---|
| 6,851,161 B2 | 2/2005 | Kingsford et al. |
| 6,896,759 B2 | 5/2005 | Fujisawa et al. |
| 6,913,810 B2 | 7/2005 | Wang et al. |
| 6,920,675 B2 | 7/2005 | Browne et al. |
| 6,939,596 B2 | 9/2005 | Coronel et al. |
| 6,962,635 B2 | 11/2005 | Tuman et al. |
| 7,007,351 B2 | 3/2006 | Ausen et al. |
| 7,048,818 B2 | 5/2006 | Krantz et al. |
| 7,125,595 B2 | 10/2006 | Kobayashi |
| 7,181,812 B2 | 2/2007 | Kurtz, Jr. et al. |
| 2002/0000291 A1 | 1/2002 | Coenen |
| 2003/0070391 A1 | 4/2003 | Tachauer et al. |
| 2003/0114829 A1 | 6/2003 | Coenen |
| 2004/0216830 A1 | 11/2004 | Van Eperen |
| 2004/0238095 A1 | 12/2004 | Johnson |
| 2005/0189811 A1 | 9/2005 | Herrmann et al. |
| 2005/0196599 A1 | 9/2005 | Line et al. |
| 2006/0148390 A1 | 7/2006 | Woo et al. |
| 2007/0028525 A1 | 2/2007 | Woo et al. |
| 2007/0028526 A1 | 2/2007 | Woo et al. |
| 2007/0066186 A1 | 3/2007 | Annen et al. |
| 2007/0154679 A1 * | 7/2007 | Poulakis .................. 428/99 |

FOREIGN PATENT DOCUMENTS

| | | |
|---|---|---|
| EP | 0 152 497 A1 | 2/1984 |
| JP | 57-80018 | 5/1982 |
| JP | 6154016 | 6/1994 |
| JP | 9010016 | 1/1997 |
| JP | 2003144208 | 5/2003 |
| WO | WO 2005/077219 A | 8/2005 |

* cited by examiner

FASTENING MEMBER FOR A MOLDED ARTICLE

BACKGROUND

Separable fasteners are used in a variety of applications to join two objects. Hook and loop fasteners are a well-known example of separable fasteners in which a first object is provided with hook elements and a second object is provided with loop elements. The hook elements and the loop elements interact to separably fasten the two objects.

In one application of separable fasteners, a molded article carries one set of fastener elements to fasten to a corresponding set of fastener elements carried by another object. Such molded articles include seats made for automobiles, airplanes, boats, furniture, etc. The seats have a cushion carrying one or more fastening members with separable fastener elements capable of attaching to, for example, corresponding fastener elements carried on an upholstery cover for the cushion.

Typically, a fastening member having hook elements is molded into the surface of the molded article as the article is molded. In doing so, these hook elements can be fouled by liquid molding material unless the molding material is prevented from flowing between and around the hook elements. Prevention of this fouling is conventionally done, for example, by covering the hook elements with a removable film or placing an external gasket on the perimeter of the fastening member before placing the member into the mold to provide a seal against the liquid molding material.

SUMMARY

A fastening member capable of attachment to a molded article is disclosed. The fastening member may include at least one fastener element extending from a base. An anchor layer may be attached to the base. The anchor layer may extend beyond the base and include a magnetically attractable coating. The magnetically attractable coating may be substantially continuous on select portions of the anchor layer, and discontinuous on other select portions of the anchor layer.

In one embodiment, the fastening member includes a base having a first surface and a second surface, and at least one fastener element extending from the first surface of the base. An anchor layer attaches to the second surface of the base and at least a portion of the anchor layer extends laterally from the base. A magnetically attractable coating is disposed on the portion that extends laterally from the base. In a further embodiment, the magnetically attractable coating is discontinuous on the portion of the anchor layer that extends laterally from the base.

In another embodiment, the fastening member may include a base and at least one fastener element extending from the base. A magnetic seal extends outward from the base that is capable of magnetically coupling to a surface in a mold to prevent mold material from contacting the fastener element during molding. In another embodiment, an anchor layer is attached to the base and the magnetic seal includes a portion of the anchor layer coated with a magnetically attractable coating In a still further embodiment a touch fastener strip is described and includes an elongated base that has a first face, a second face that opposes the first face, and at least one side surface that connects the first face to the second face. At least a portion of the side surface slants away from the second face at an angle that is less than normal relative to the second face. A plurality of fastening elements are provided that extend from the first face of the base. A cloth member is attached to the second face of the base. The cloth member has a first portion that extends over the length of the second face of the base and a second portion that extends laterally from the base. A magnetically attractable coating is disposed on the cloth member, and the coating is substantially continuous on the first portion of the cloth member and is discontinuous on the second portion of the cloth member.

BRIEF DESCRIPTION OF THE DRAWINGS

In the accompanying drawings, which are incorporated in and constitute a part of this specification, embodiments of the invention are illustrated which, together with a general description of the invention given above and the detailed description given below, serve to exemplify the principles of this invention, wherein.

DETAILED DESCRIPTION

In an illustrated embodiment of a device applying at least some of the principles of the invention, a fastening member capable of attachment to a molded article is disclosed. The fastening member may be a component of a two component separable fastener, such as a hook and loop fastener. The fastening member may include a plurality of fastening elements extending from a base and an anchor layer having a magnetically attractable coating. The magnetically attractable coating may be substantially continuous on select portions of the anchor layer and discontinuous on other select portions of the anchor layer.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

Figure 1:
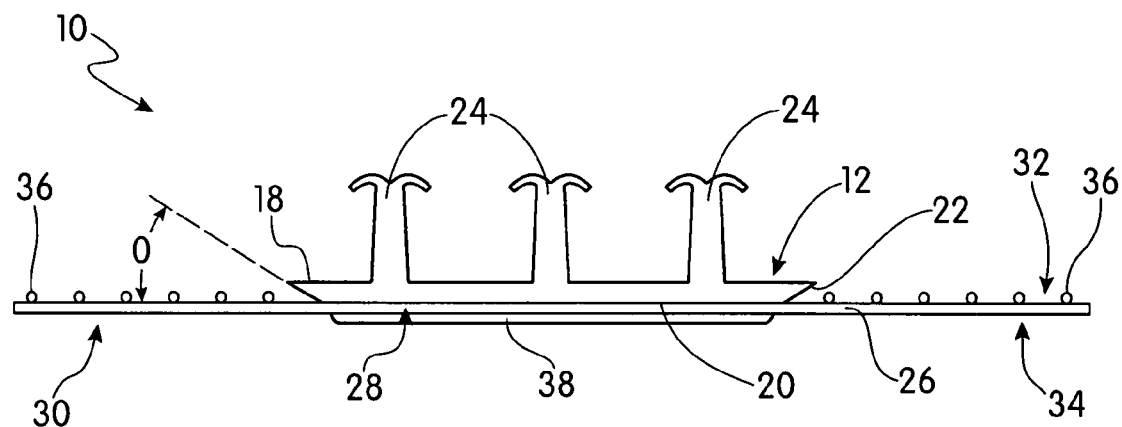
FIG. 1 is a side view of a first embodiment of a fastening member as disclosed in the present application.

FIG. 1 illustrates an embodiment of a fastening member 10 or "touch fastener strip" as disclosed in the present application. The fastening member 10 is capable of being attached to a molded article and separatably attached to a second fastening member (not shown). The fastening member 10 includes a base 12. The base 12 may be configured in a variety of ways, using a variety of materials. Any structure capable of being attached to, or molding into, a moldable article and is capable of separatably attaching with a second fastening member may be used. In the depicted embodiment, the base 12 is formed as a generally rectangular strip or elongate (see FIG. 2) having a first end 14 and a second end 16.

Referring to FIG. 1, the base 12 includes a first surface or face 18 and a second surface or face 20. The first surface 18 is connected to the second surface 20 by at least one side surface 22. In the illustrated embodiment, the side surface 22 extends away from the second surface 20 at an angle θ that is less than normal (i.e. less than 90 degrees), though that is not required. The angled side surface, or portion of the side surface, helps an anchor layer 26 drape over the sides of the base 12, as discussed in more detail below. In other embodiments, the side surface, or portion thereof, may be configured in other ways to help drape the anchor layer over the base. For example, the base may include a rounded or chamfered edge.

The fastening member 10 also includes at least one fastener element(s) 24 disposed on and extending outward from the first surface 18 of the base 12. The fastener element(s) 24 may extend from the first surface 18 at a variety of heights, either randomly or in a predetermined pattern. There is at least one fastener element 24, but the number of fastener elements may be selected without departing from the spirit and scope of the invention. The fastener elements 24 may be configured in a variety of ways, such as for example, various shapes, materials, arrangements, numbers of elements. Any structure capable of separable attaching to a second fastening member (not shown) may be used. In the illustrated embodiment, the fastener elements 24 are shaped in a palm-tree hook configuration (see FIG. 1). In another embodiments, the fastener elements 24 may be a loop shape or a hook shape, such as for attachment to corresponding hook-shaped elements or loop-shaped elements, respectively, in a hook-and-loop arrangement.

In a depicted embodiment, the base 12 and the at least one fastener element 24 are integrally formed from a thermoplastic polymer. Suitable polymers include, but are not limited to, nylon or other polyamides, polypropylene, polyethylene, polyethylene terephthalate, and co-polymers, derivatives, and mixtures thereof. The base 12 and fastener element 24, however, may be formed from any suitable material and need not be integrally formed. The fastener element 24 may be separately formed from the same material as the base 12 or from a different material than the base. The separately formed fastener element 24 may be attached to the base 12 in any suitable manner.

Figure 2:
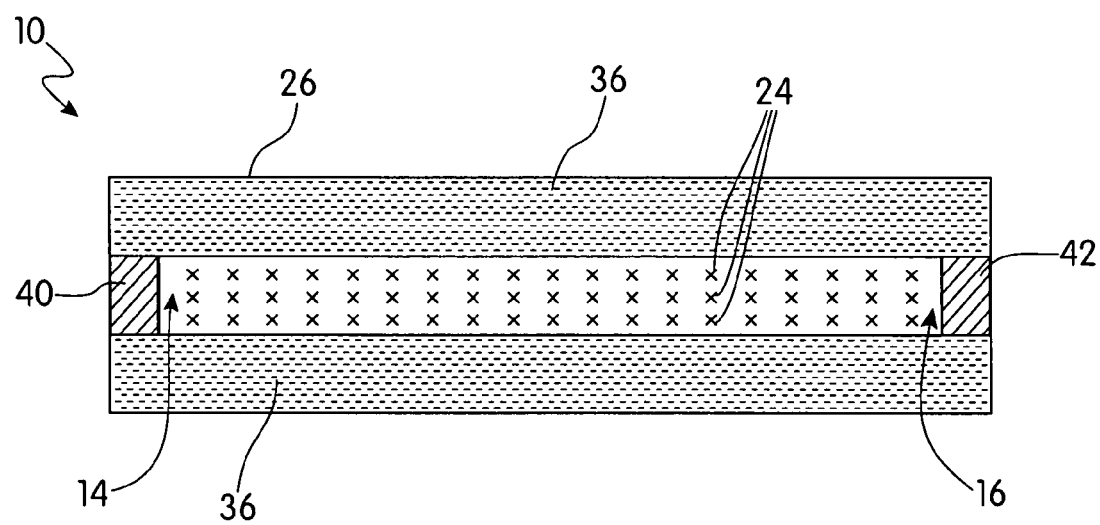
FIG. 2 is a top view of the fastening member of FIG. 1.

As illustrated in FIG. 2, the base 12 includes three separate rows of fastener elements 24 that extend along the length of the base. The number and arrangement of fastener elements 24, however, may vary in various embodiments of the fastening member 10. For example, the number of fastener elements 24, the pattern of fastener elements, and the number of rows (if arranged in rows) may differ between different embodiments of the fastening member 10 without departing for the spirit and scope of the present invention.

In the illustrated embodiment, an anchor layer 26 attaches to the second surface 20 of the base 12, as shown in FIG. 1. The anchor layer 26 may attach to the base 12 by any suitable means, such as for example, ultrasonic welding or an adhesive applied between at least a portion of the anchor layer 26 and the second surface 20 of the base 12. Any suitable adhesive may be used. Other possible attachment methods include embedding the anchor layer 26 in the second surface 20 of the base 12 while the base 12 is still soft following extrusion; using staples, brads, or other mechanical fastening; and pressure bonding or welding the anchor layer 26 to the second surface 20.

The anchor layer 26 is capable of being molded into, or otherwise attaching to, a surface of a molded article. For example, molding material, which used to fabricate the molded article, may adhere to or attach to the anchor layer 26 as the material solidifies during the molding process, as discussed in more detail below. The anchor layer 26 may comprise any suitable material that is attachable to a molded article. In the depicted embodiment, the anchor layer 22 is a cloth or a fabric, such as a non-woven fabric.

As illustrated in FIGS. 1 and 2, in the depicted embodiment, the anchor layer 26 attaches to the second surface 20 of the base 12 and extends laterally from either side of the base 12. Thus, a first portion 28 of the anchor layer 26 extends over the length of the second surface 20 and a second portion 30 of the anchor layer extends outward from the second surface. The distance that the anchor layer 26 extends from the base 12 may vary. Any distance in which the anchor layer 26 may extend to contact a mold surface to form a seal with the mold surface is suitable. When attached, the anchor layer 26 has a first surface 32, to which the base is attached, and a second surface 34 opposite from the surface to which the base is attached.

A magnetically attractable coating is disposed on the anchor layer 26. Such a coating is capable of cooperating with a mold to (i) secure the position of the fastening member 10 after it is placed in the mold and/or (ii) prevent fouling of the fastener elements 24 by the molding material during molding, as discussed in more detail below. In the depicted embodiment, the magnetically attractable coating comprises iron oxide, such as, for example, a vinyl/iron oxide mixture. Any ferro-magnetic material, however, that is capable of being applied to the anchor layer 26 as a coating, or in a coating, may be used.

The magnetically attractable coating may be disposed on the anchor layer 26 at a variety of locations and by any suitable method. Any location that provides a means for sealing the fastener element 24 during molding and/or a means for aligning and securing the fastening member 10 during molding may be used. In the depicted embodiment, as illustrated in FIGS. 1 and 2, a discontinuous magnetically attractable coating 36 is disposed on the first surface 32 of the anchor layer 26 on the second portion 30 (or lateral extension). In another embodiment, the discontinuous magnetically attractable coating 36 may be disposed on the second surface 34 of the anchor layer 26. In addition, a substantially continuous magnetically attractable coating 38 is disposed on the second surface 34 of the anchor layer 26 on the first portion 28, which extends the length of the second surface 20 of the base 12. Thus, the magnetically attractable coating may be substantially continuous on select portions of the anchor layer and discontinuous on other select portions of the anchor layer.

As illustrated in FIG. 2, the fastening member 10 also includes first and second end seals 40, 42 located at opposite ends of the fastening member 10. The end seals 40, 42 may be configured in a variety of ways. Any structure capable of preventing fouling of the fastener elements 24 by the molding material during molding may be used. In the depicted embodiment, the end seals 40, 42 are generally box-shaped sections of foam that are attached to the anchor layer 26 adjacent the first and second end 14, 16 of the base 12, respectively. The end seals 40, 42 may attach to the anchor layer 26 by any suitable means, such as for example, by an adhesive.

Figure 3:
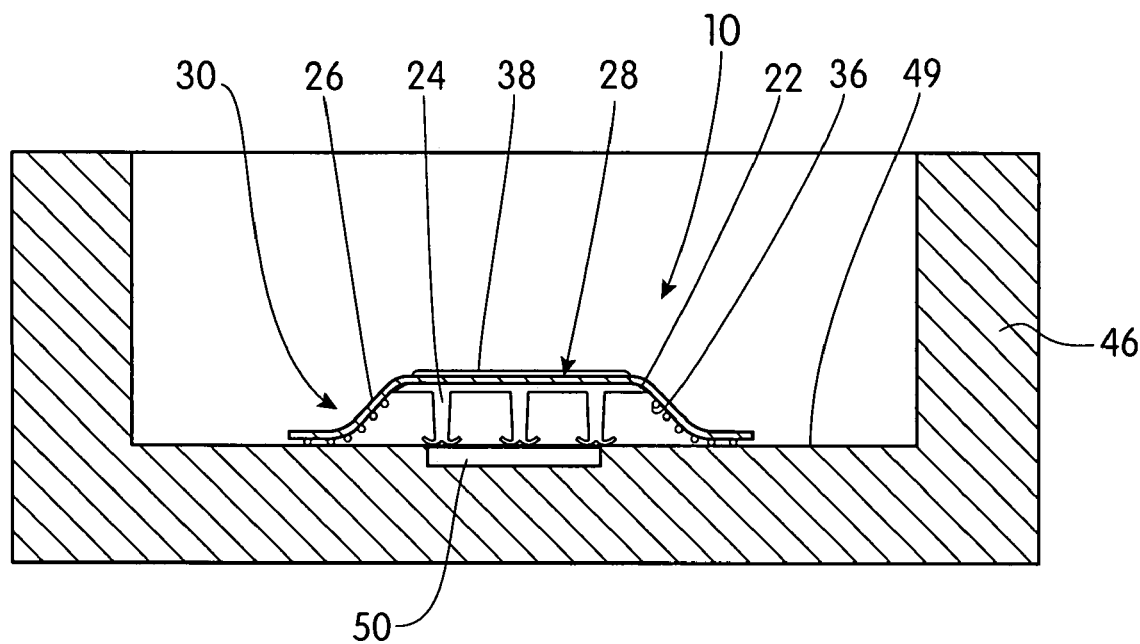
FIG. 3 is a side view of the fastening member of FIG. 1 disposed within a mold.
Figure 4:
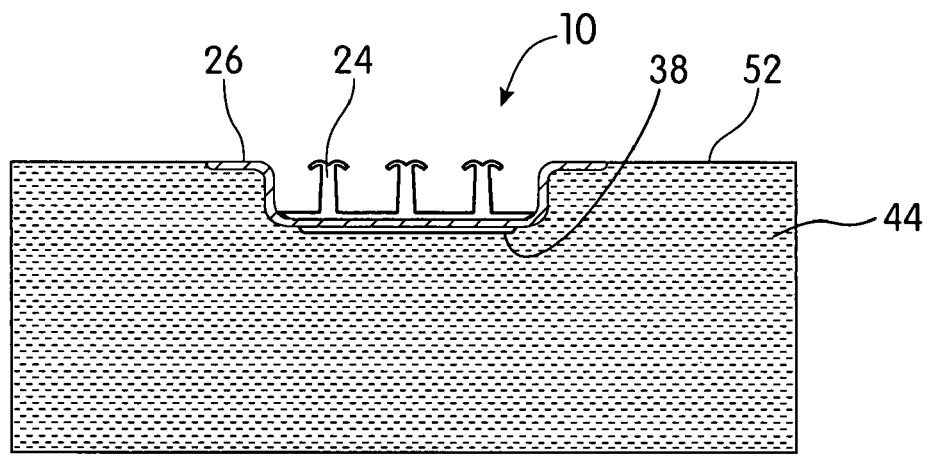
FIG. 4 is a side view of the fastening member of FIG. 1 attached to a molded article.

The fastening member 10 is capable of attachment to a molded article 44 (see FIG. 4). In the depicted embodiment, the fastening member 10 is placed into a mold 46 in which the molded article 44 is to be formed, as illustrated in FIG. 3. The fastening member 10 is placed in the mold 46 with the fastener elements 24 facing a mold surface 49, such as the bottom of the mold. The anchor layer 26 drapes over the edges of the base 12 and contacts the mold surface 49. The angled side surface 22 directs the portions of the anchor layer 26 that extend laterally from the base towards the mold surface 49, thus promoting sealing of the anchor layer and the mold, as discussed below.

The mold 46 includes one or more magnets 50 capable of attracting the magnetically attractable coating 36, 38 of the fastening member 10. The magnets 50 may be placed in any suitable location within the mold 46. In the depicted embodiment, the magnets 50 are generally positioned along the centerline of the mold 46. The attraction of the magnetically attractable coating 36, 38 by the magnets 50 provides at least two functions. First, the attraction self-positions or self-centers the fastening member 10 within the mold 46 and holds the fastening member 10 in place as liquid molding material is placed into the mold. The substantially continuous magnetically attractable coating 36 on the first portion 28 of the anchor layer 26 results in the base 12 being quickly aligned over the magnets 50 due to the strength of attraction between the coating 36 and the magnets.

Second, the attraction between the magnets 50 and the magnetically attractable coating 38 on the second portion 30 of the anchor layer 26 provides a magnetic seal between the second portion and the mold 46 (i.e., the second portion magnetically attaches to the mold floor 49). As liquid molding material is placed into the mold 46, the magnetic seal prevents the molding material from fouling the fastener elements 24. The discontinuous magnetically attractable coating 36 on the second portion 30 of the anchor layer 26 provides a lower strength magnetic attraction than between the substantially continuous magnetically attractable coating 38 and the magnets 50. This allows for easier alignment of the fastening member 10 in the mold 46 while still providing a magnetic seal.

As liquid molding material is placed into the mold 46, the molding material engages the anchor layer 26. When the liquid molding material solidifies into the molded article 44, the anchor layer 26 bonds with, or otherwise attaches to, the solidified molding material; thus, the fastening member 10 is attached to the molded article 44.

As illustrated in FIG. 4, the resulting molded article 44 includes the fastening member 10 attached thereto. FIG. 4 illustrates the fastening member 10 embedded in the surface 52 of the molded article 44. More than one fastening member 10 may be attached to the molded article 44. The depth to which the fastening member 10 is embedded may be varied without departing from the spirit or scope of the invention.

Figure 5:
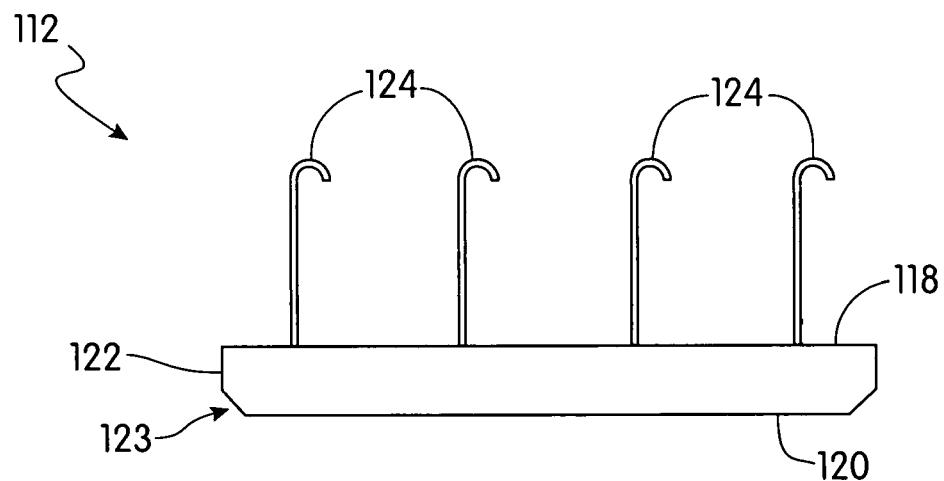
FIG. 5 is a side view of a base for a second embodiment of a fastening member as disclosed in the present application.

FIG. 5 illustrates a base for a second embodiment of a fastening member as disclosed in the present application. The base 112 includes a first surface or face 118 and a second surface or face 120. The first surface 118 is connected to the second surface 120 by at least one side surface 122. In the illustrated embodiment, the side surface 122 includes a chamfered or drafted portion 123 adjacent the second surface 120.

The base 112 also includes at least one fastener element(s) 124 disposed on and extending outward from the first surface 118. The fastener element(s) 124 may extend from the first surface 118 at a variety of heights, either randomly or in a predetermined pattern. There is at least one fastener element 124, but the number of fastener elements may be selected without departing from the spirit and scope of the invention. The fastener elements 124 may be configured in a variety of ways, such as for example, various shapes, materials, arrangements, numbers of elements. Any structure capable of separable attaching to a second fastening member (not shown) may be used. In the illustrated embodiment, the fastener elements 124 are shaped in a hook configuration.

In a depicted embodiment, the base 112 is a thermoplastic polymer, though any suitable material may be used for the base. Suitable polymers include, but are not limited to, nylon or other polyamides, polypropylene, polyethylene, polyethylene terephthalate, and co-polymers, derivatives, and mixtures thereof.

As illustrated, the base 112 includes four separate rows of fastener elements 124 that extend along the length of the base. The number and arrangement of fastener elements 124, however, may vary in various embodiments of the base 112. For example, the number of fastener elements 124, the pattern of fastener elements, and the number of rows (if arranged in rows) may differ between different embodiments of the base 112 without departing for the spirit and scope of the present invention.

Figure 6:
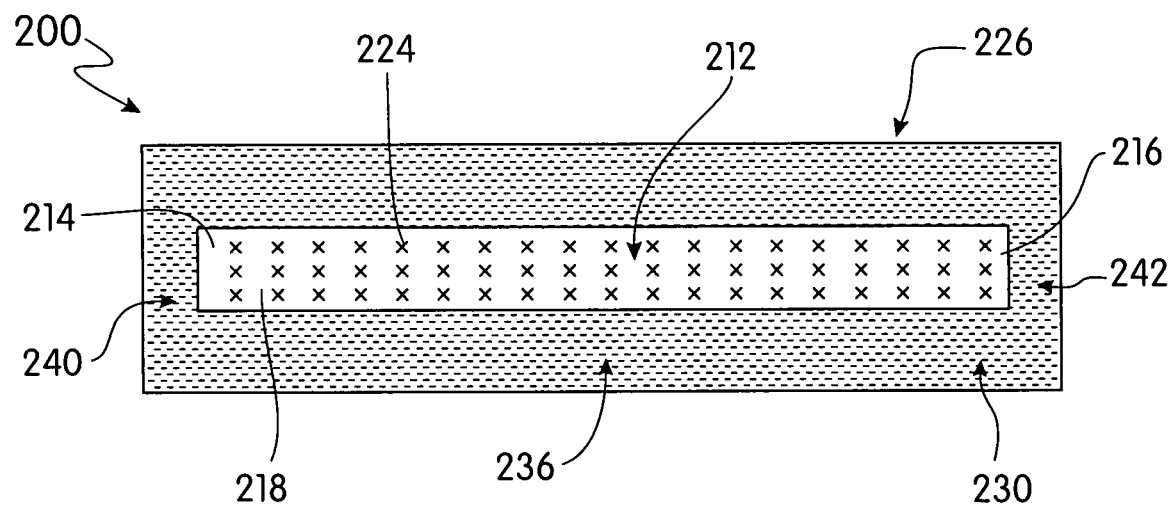
FIG. 6 is a top view of a third embodiment of a fastening member as disclosed in the present application.

FIG. 6 illustrates a third embodiment of a fastening member 200 as disclosed in the present application. The fastening member 200 is similar to the embodiment of the fastening member 10 of FIGS. 1-4 in that it includes an elongated base 212 having a first end 214, a second end 216 and a first surface 218. A plurality of fastener elements 224 extend from the first surface 218. The fastening member 200 also includes an anchor layer 226 attached to the base 212. The anchor layer 226 includes a portion 230 extending outward from the base. The portion 230 that extends outward from the base 212 is coated with a discontinuous magnetically attractable coating 236.

Unlike, the fastening member 10 of FIGS. 1-4, however, the fastening member 200 depicted in FIG. 6 does not include first and second end seals attached to the anchor layer 226. Instead, the anchor layer 226 has a first end portion 240 and a second end portion 242 that extend outward from each the first end 214 and the second end 216 of the base 212, respectively. Each end portion 240, 242 is also coated with a discontinuous magnetically attractable coating 236.

When installed in a mold, similar to that described above with respect to the fastening member 10 of FIGS. 1-4, each end portion 240, 242 forms a magnetic seal with the surface of the mold to provide a seal the prevent the moldable material from fouling the fastener elements 224 during the molding process.

The invention has been illustrated by the above description of embodiments, and while the embodiments have been described in some detail, it is not the intent of the applicants to restrict or in any way limit the scope of the invention to such detail. Additional advantages and modifications will readily appear to those skilled in the art. Therefore, the invention in its broader aspects is not limited to the specific details, representative apparatus and methods, and illustrative examples shown and described. Accordingly, departures may be made from such details without departing from the spirit or scope of the applicants' general or inventive concept.

I claim:

1. A fastening member suitable for attachment to a molded article, comprising:
    a base having a first surface and a second surface, the first surface of the base is connected to the second surface of the base by at least one side surface, wherein at least a portion of the at least one side surface slants away from the second surface of the base at an angle less than normal relative to the second surface;
    at least one fastener element extending from the first surface of the base;
    an anchor layer attached to the second surface, wherein at least a portion of the anchor layer extends laterally from the base; and
    a magnetically attractable coating disposed on the portion of the anchor layer that extends laterally from the base.

2. The fastening member according to claim 1, wherein the magnetically attractable coating is discontinuous.

3. The fastening member according to claim 2, wherein the anchor layer has a first side and a second side, opposite of the first side, and wherein the base is attached to the first side and the discontinuous magnetically attractable coating is disposed on the first side.

4. The fastening member according to claim 1, wherein the anchor layer has a first side and a second side, opposite of the first side, and wherein the base is attached to the first side and a substantially continuous magnetically attractable coating is disposed on the second side opposite of where the base is attached to the first side.

5. The fastening member according to claim 4, wherein the magnetically attractable coating disposed on the at least a portion of the anchor layer that extends laterally from the base is discontinuous.

6. The fastening member according to claim 1, wherein the anchor layer bonds to molding material during the molding process such that the fastening member is secured to the molded article.

7. The fastening member according to claim 1, wherein the anchor layer comprises a nonwoven fabric.

8. The fastening member according to claim 1, wherein the anchor layer is attached to the second surface of the base by ultrasonic welding or an adhesive.

9. The fastening member of claim 1, wherein the at least one fastener element is integrally formed with the base.

10. The fastening member of claim 1, wherein the at least one fastener element comprises umbrella-shaped elements.

11. The fastening member of claim 1, wherein the base comprises an extruded thermoplastic polymer.

12. The fastening member of claim 1, wherein the magnetically attractable coating comprises iron oxide.

13. The fastening member of claim 1, wherein the base further comprises a first end and a second end, and wherein foam seals are disposed adjacent the first end and second end.

14. The fastening member of claim 1, wherein the base further comprises a first end and a second end, and wherein the anchor layer extends beyond the first end and the second end, and wherein a discontinuous magnetically attractable coating is disposed on the anchor layer that extends beyond the first end and second end.

15. A fastening member suitable for attachment to a molded article by molding the fastening member into the molded article as the article is molded, the fastening member comprising:
    a base having a first surface and a second surface, the first surface of the base is connected to the second surface of the base by at least one side surface, and wherein at least a portion of the at least one side surface slants away from the second surface of the base at an angle less than normal relative to the second surface;
    a plurality of fastener elements extending from the first surface;
    an anchor layer attached to the second surface;
    a magnetic seal extending outward from the base, the magnetic seal capable of magnetically coupling to a surface in a mold to prevent mold material from contacting the plurality of fastener elements during molding.

16. The fastening member of claim 15, wherein the magnetic seal comprises a portion of the anchor layer coated with a magnetically attractable coating.

17. The fastening member of claim 16, wherein the magnetically attractable coating is discontinuous.

18. A touch fastener strip, comprising
    an elongated base having a first face, a second face that opposes the first face, and at least one side surface that connects the first face to the second face, wherein at least a portion of the side surface slants away from the second face at an angle less than normal relative to the second face;
    a plurality of fastening elements extending from the first face of the base;
    a cloth member attached to the second face of the base, the cloth member having a first portion that extends over the length of the second face of the base and a second portion that extends laterally from the base; and
    a magnetically attractable coating disposed on the cloth member, wherein the coating is substantially continuous on the first portion of the cloth member and is discontinuous on the second portion of the cloth member.

* * * * *